Figure 1:
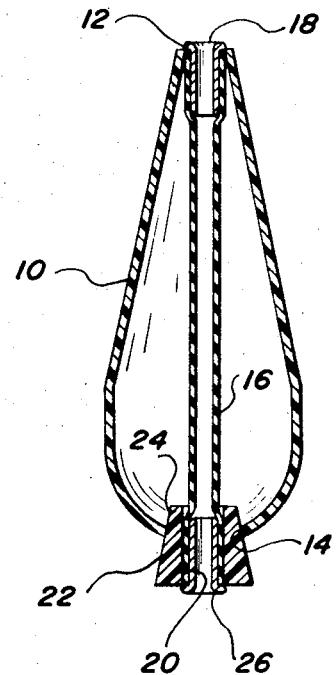

United States Patent [19]
Bondhus

[11] 3,744,176
[45] July 10, 1973

[54] CASTING BUBBLE
[75] Inventor: John M. Bondhus, Fort Collins, Colo.
[73] Assignee: Rainbow Plastics Inc., Fort Collins, Colo.
[22] Filed: Oct. 15, 1971
[21] Appl. No.: 189,565

[52] U.S. Cl............... 43/43.14, 43/44.87, 43/44.91, 43/44.95
[51] Int. Cl............................................ A01k 93/00
[58] Field of Search............... 43/44.87, 44.9, 44.91, 43/44.95, 43.14; 46/90

[56] References Cited
UNITED STATES PATENTS

| | | | |
|---|---|---|---|
| 2,874,511 | 2/1959 | Hettrick | 43/44.87 |
| 2,570,293 | 10/1951 | Vadnais | 43/44.91 |
| 2,763,088 | 9/1956 | Cowsert | 43/44.87 X |
| 3,066,440 | 12/1962 | Van Dam | 46/90 X |
| 2,645,051 | 7/1953 | Stofleth | 43/44.9 X |
| 3,084,470 | 4/1963 | Heater | 43/44.91 |
| 2,992,508 | 7/1961 | Schmidt | 43/44.91 |
| 3,019,546 | 2/1962 | Hansen | 43/44.91 |
| 2,772,509 | 12/1956 | Vadnais | 43/44.91 |

*Primary Examiner*—Russell R. Kinsey
*Assistant Examiner*—James H. Czerwonky
*Attorney*—Hugh H. Drake, John G. Batchelder et al.

[57] ABSTRACT

A casting bubble which may be mounted upon a fishing line either for free sliding movement on the line or clamped to the line at a selected position of adjustment. The bubble includes an elongate hollow shell having a resilient tube mounted to extend through the interior of the shell from one end to the other. The tube is sealingly clamped to the shell at one end and carries a stopper at its opposite end engageable within an opening at the opposite end of the shell to seal the interior of the shell. The tube, in its unstretched condition, is somewhat shorter than the length of the shell so that the stopper is resiliently held in sealing engagement within the opening by the tube. The line passes through the tube and is clamped when the stopper end of the tube is rotated to sufficiently reduce the inner diameter of the tube. The stopper end may also be pulled outwardly of the shell to admit or release water for weight variation.

1 Claim, 2 Drawing Figures

PATENTED JUL 10 1973  3,744,176

INVENTOR
JOHN M. BONDHUS

BY
Drake, Crandell, and Batchelder

ATTORNEYS

CASTING BUBBLE

SUMMARY OF THE INVENTION

A major object of the present invention is to provide the fisherman with a simple and fool-proof bubble which may be employed in several different manners in fishing with either bait or artificial lures. The multipurpose bubble is constructed, in a manner to be described in more detail below, so that it may be frictionally clamped to the line at a desired distance from the lure to serve as a float or bobber with the lure supported at a desired depth or alternatively mounted upon the line for free sliding movement useful in certain fly and spin casting techniques. The bubble may if desired, be partially or completely filled with water to achieve a desired casting weight.

The bubble includes a hollow transparent shell, preferably of the so-called torpedo shape, through which is stretched a hollow rubber tube fixed at one end in an opening in the shell wall and fixed at its other end to a stopper, the stretched tube normally holding the stopper in sealed engagement within an opening in the shell wall. The fish line is passed through the interior of the tube whose internal diameter is large enough to permit the line to slide freely through the tube. To clamp the bubble to the line at a selected position on the line, the stopper is rotated to twist the tube to thereby clamp the tube to the line. The frictional engagement of the stopper within the shell opening, augmented by the shortening of the tube by the twisting locks the tube against unwinding from its twisted condition. The interior of the shell may be completely or partially filled with water by manually pulling the stopper clear of the opening against the biasing action of the tube and submerging the bubble, release of the stopper permitting the tube to resiliently pull the stopper to its closed sealed position to trap the water in the interior of the shell. The specific gravity of the bubble is slightly less than that of water, hence the bubble remains buoyant regardless of whether or not it contains water.

Other objects and features of the invention will become apparent by reference to the following specification and to the drawings.

IN THE DRAWINGS

Figure 2:
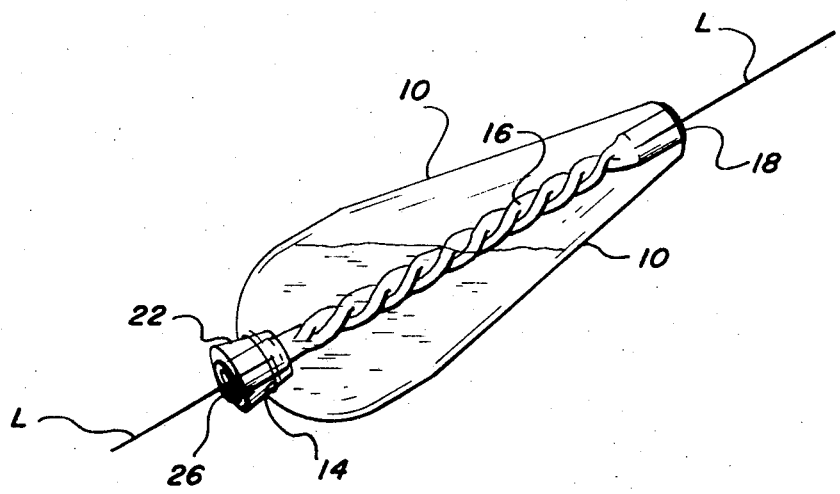

FIG. 1 is a cross sectional view, taken on an axial plane, of a bubble embodying the present invention; and FIG. 2 is a perspective view showing the bubble of FIG. 1 clamped to a fishing line and partially filled with water.

The bubble of the present invention includes a hollow shell 10, preferably of an elongate tear drop or so-called torpedo shape. Shell 10 may be constructed from any of several commercially available plastic materials, such as polystyrene, butyrate, etc. by conventional plastic molding techniques. The specific material employed will preferably have a specific gravity of slightly less than that of water and will preferably be of a transparent nature. Shell 10 is formed with openings 12 and 14 at its opposite longitudinal ends, the opening 14 at the larger end of shell 10 being somewhat larger in diameter than opening 12 and preferably formed as a frusto-conical surface inclined inwardly toward the interior of shell 10.

An elongate hollow tube 16 of rubber or some other water impervious resilient material extends longitudinally through the interior of shell 10 and is sealingly clamped at one end within opening 12 by means of a hollow bushing 18. The external diameter of bushing 18 is sufficiently larger than the internal diameter of tube 16 so that the circumferential stretching of the tube required by the insertion of bushing 18 frictionally couples the tube to the bushing with a fair degree of firmness. The diameter of opening 12 in shell 10 is chosen to be somewhat smaller than the external diameter of tube 16 when expanded by bushing 18 so that when the tube is seated in the shell as best seen in FIG. 1, a water tight seal is formed between the exterior of the tube and the wall of opening 12. The compressing of the wall of tube 16 between bushing 18 and the wall of opening 12 frictionally locks tube 16 against rotation within opening 12 and also further increases the frictional grip between bushing 18 and the tube.

At its opposite end, tube 16 is sealingly clamped within a bore 20 which extends through a stopper 22 having a frusto-conical side surface 24 matched to the frusto-conical wall of opening 14. Tube 16 is frictionally clamped to the wall of bore 20 by means of a bushing 26. The outer diameter of bushing 26 is related to the inner diameter of tube 16, the wall thickness of tube 16 and the diameter of bore 20 so that when the bushing and tube are inserted within bore 20, the tube is firmly frictionally clamped into sealing engagement with stopper 22.

The length of tube 16 in its unstretched or relaxed condition is chosen to be somewhat less than the distance between openings 12 and 14 so that when the stopper is in the position shown in FIG. 1, wherein opening 14 is sealed around the periphery of the stopper, tube 16 is longitudinally stretched to exert a resilient biasing force pulling stopper 22 inwardly of shell 10 to establish a water tight seal around the joint between stopper 22 and the wall of opening 14. Thus, when stopper 22 is seated in opening 14, a watertight chamber is formed in the interior of shell 10.

The maximum diameter of stopper 22 is greater than the maximum diameter of opening 14 so that the stopper, when seated in opening 14, projects outwardly from shell 10 a sufficient distance to enable the stopper to be manually grasped between the thumb and forefinger so that the stopper may be pulled out clear of opening 14 or twisted relative to shell 10.

The internal diameter of tube 16 in its slightly stretched assembled position as shown in FIG. 1 is approximately one-eighth to three-sixteenths of an inch, thus providing a substantial clearance for the free passage of a fishing line through the interior of tube 16 when the tube is in its normal untwisted configuration. To clamp the bubble to the line, the line is passed through tube 16 and the bubble is moved along the line until it is located at the desired position. The projecting end of stopper 22 is then grasped and twisted about the axis of the stopper to thereby twist the tube in the manner illustrated in FIG. 2. The twisting of the resilient tube causes the tube to frictionally grip the line to clamp the bubble to the line at the desired position. The frictional grip between stopper 22 and the wall of opening 14 is sufficient to rotatively lock the stopper to the shell against the torsional bias applied to it by the twisted tube.

To increase the weight of the bubble for casting purposes, the interior of shell 10 may be partially or completely filled with water by pulling stopper 22 axially outwardly from the shell to unseal opening 14.

While one embodiment has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. A casting bubble comprising a hollow water-tight shell having a pair of aligned openings at opposite ends of said shell, an elongate hollow tube of resilient stretchable material extending through the interior of said shell from one of said openings to the other, anchor means fixedly and sealingly mounting one end of said tube within one of said openings to seal the interior of said shell around said one of said openings and to mechanically fix said one end of said tube to said shell within said one of said openings, annular resilient stopper means mounted on the exterior of said tube at the other end of said tube and projecting through and sealingly engaged within the other of said openings to seal the interior of said shell around said other of said openings, said tube having a normal length slightly less than the distance between said openings to resiliently hold said stopper means in said other of said openings while resiliently accommodating axial movement of said stopper means outwardly clear of said other of said openings to permit the flow of water in to or out of the interior of said shell, said tube having an axial bore extending completely therethrough, and wherein a portion of said bore has a variable internal diameter normally greater than the diameter of a fishing line to accommodate free sliding movement of said bubble along the fishing line passed through said tube when the tube is in a normal untwisted condition and also less than the fishing line diameter to frictionally clamp the bubble to the line when said other end of said tube is sufficiently rotated relative to said one end of said tube to a position wherein the tube is twisted, said stopper means being frictionally engageable with said shell to retain said tube in its line clamping twisted condition when seated in said other of said openings.

* * * * *